March 6, 1928.
W. N. GILBERT
1,661,534
PENDULUM SCALE
Filed Jan. 12, 1926
3 Sheets-Sheet 2
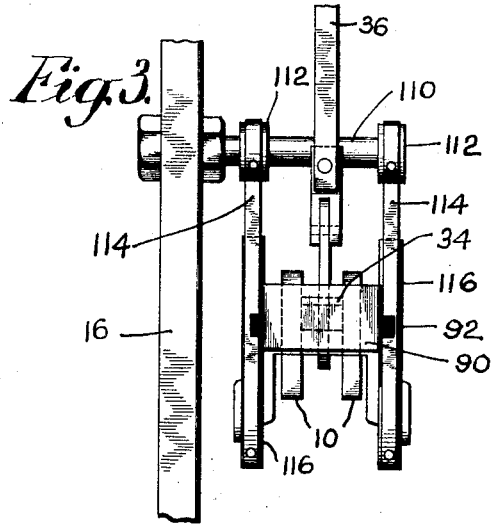
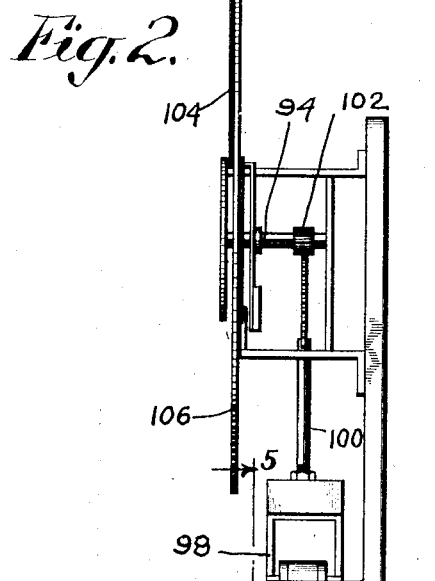
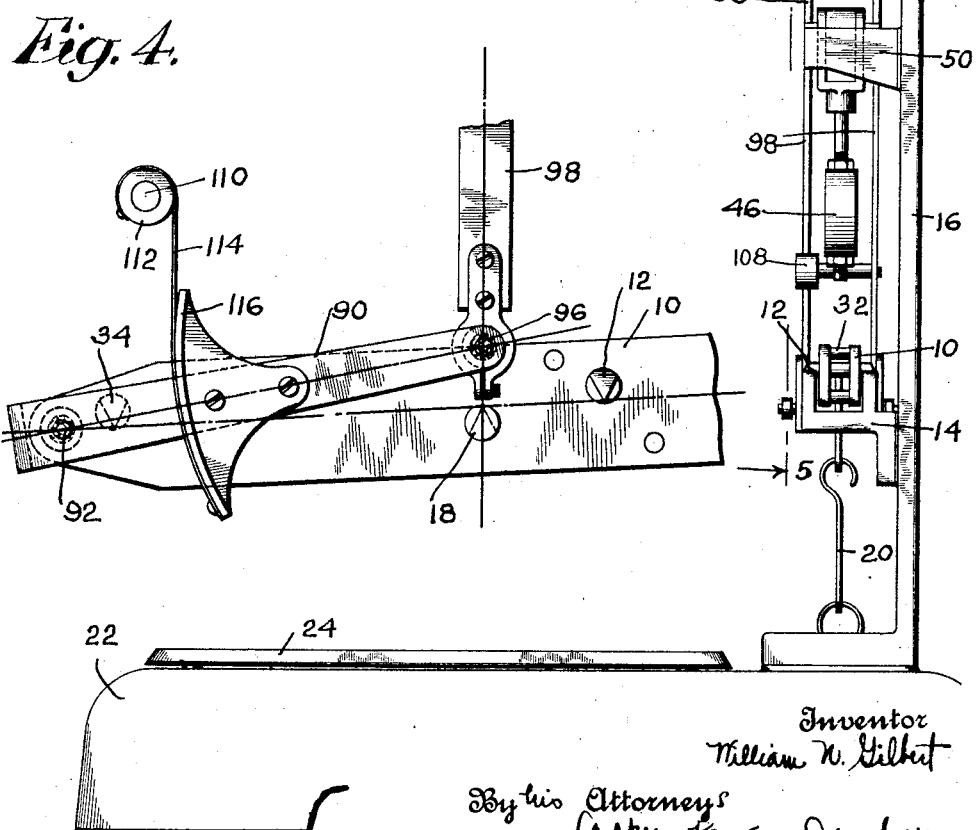
Inventor
William N. Gilbert
By his Attorneys
Cooper, Kerr & Dunham March 6, 1928.  1,661,534

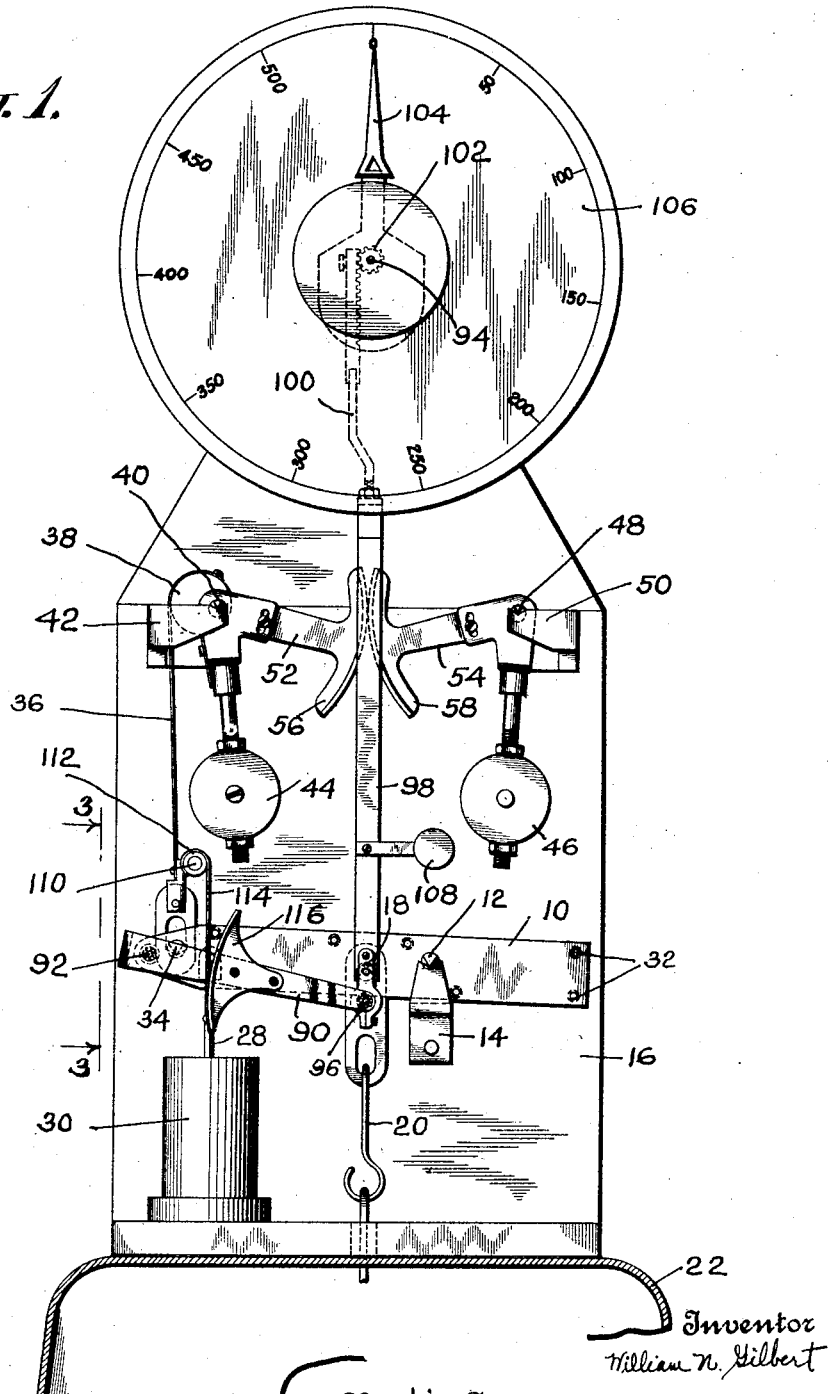

W. N. GILBERT

PENDULUM SCALE

Filed Jan. 12, 1926  3 Sheets-Sheet 3

Inventor
William N. Gilbert
By his Attorneys
Cooper, Kerr & Dunham

Patented Mar. 6, 1928.

1,661,534

UNITED STATES PATENT OFFICE.

WILLIAM N. GILBERT, OF HUDSON HEIGHTS, NEW JERSEY, ASSIGNOR TO DAYTON SCALE COMPANY, OF DAYTON, OHIO, A CORPORATION OF NEW JERSEY.

PENDULUM SCALE.

Application filed January 12, 1926. Serial No. 80,727.

This invention pertains to automatic weighing scales of the pendulum type and discloses improvements in the scale covered in my copending application, Serial No. 61,928, filed October 12, 1925.

This invention relates particularly to an improved detail of the above design, particularly the method of actuating the indicator devices.

In the drawings,

Fig. 1 is a front view of my machine with outer casing removed.

Fig. 2 is a side view of Fig. 1 taken from the right.

Fig. 3 is an enlarged detail on line 3—3 of Fig. 1.

Fig. 4 is a front view of the parts shown in Fig. 3 with other details of the device for actuating the indicator.

Figure 5:
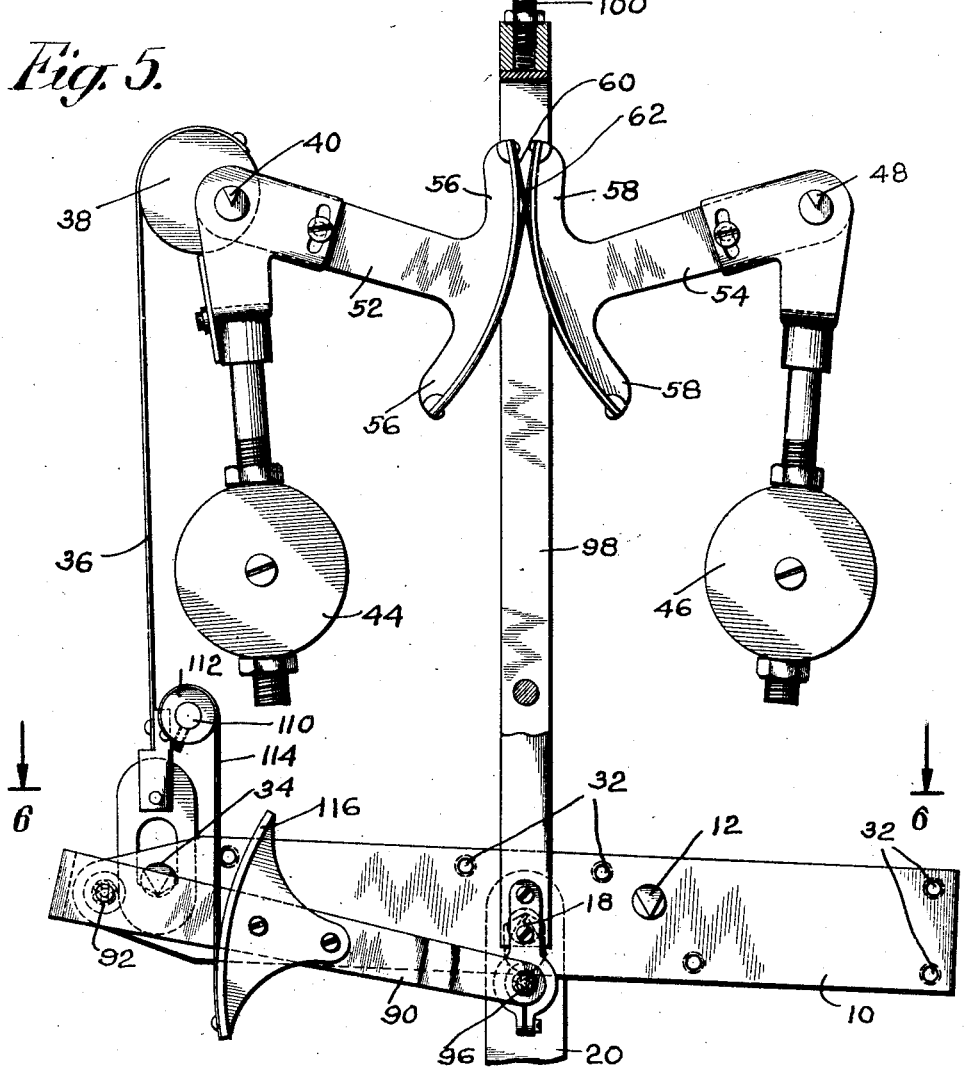
Fig. 5 is an enlarged view of the central portion of Fig. 1 on line 5—5 of Fig. 2 with pendulum bearings removed and a portion of rack yoke cut away.
Figure 6:
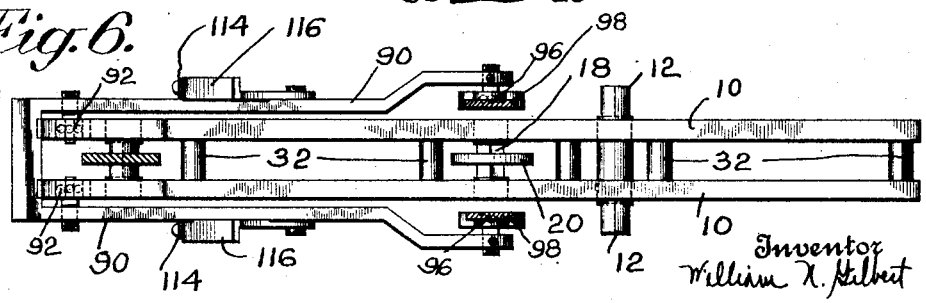
Fig. 6 is a view on line 6—6 of Fig. 5.

The main lever 10 has a fulcrum pivot 12 resting in fulcrum bearing 14 supported on frame 16. To the left of the fulcrum bearing is a load pivot 18 connected by steelyard 20 to the lever system contained within the base 22. The base levers are not shown as any system of levers suitable for use with automatic load offsetting devices may be used. The load receiving platform 24 is carried by the base levers.

30 is the usual dash pot connected by rod 28 to lever 10 to check undue vibration of the scale parts.

Lever 10 is formed of two similar side plates spaced apart and rigidly fastened together by studs 32.

Near the left end of lever 10 is a pivot 34 from which extends upwardly a tape or ribbon 36 which at its upper end passes partly around the circumference of cam 38 and is fastened thereto. Cam 38 is the well known device commonly used in pendulum scales to counterbalance for the angularity of the pendulum swing thereby permitting the charts or dials to be evenly graduated.

Cam 38 is fast to pivot 40 which rests in fulcrum bearing 42 and carries left hand pendulum 44. On the right side of the machine a similar pendulum 46 has a pivot 48 supported in fulcrum bearing 50. Extending laterally towards the center of the machine from pivots 40 and 48 are the arms 52 and 54 respectively. Each arm is adjustably secured by a slot and screw device to its pendulum, but after adjustment each arm is in effect integral with its respective pendulum. Arm 52 terminates in an arcuate portion 56 and arm 54 has an exactly similar arcuate portion 58 (Fig. 5). The two arcuate portions 56 and 58 are in close proximity to each other and are operably connected by metal tapes or ribbons, the upper end of arc 56 being connected by tape 60 to the lower end of arc 58, and the upper end of arc 58 being connected to the lower end of arc 56 by tape 62. It will be readily understood that this construction provides a positive, frictionless connection between pendulums so that if either pendulum swings on its pivot the other will swing an exactly similar amount in the opposite direction. If one pendulum swings towards the center of the machine the other will also swing towards the center an exactly similar distance and if one swings outwardly the other will also swing outwardly the same amount.

Pivotally mounted on the left hand end of lever 10 is the yoke shaped auxiliary lever 90, its pivot bearings 92 being preferably of the ball type or something similar, although the usual scale pivot type of bearing may be used if desired. The free ends of auxiliary lever 90 are on approximately the the center plane of the machine which contains the axis of indicator shaft 94 and these free ends of lever 90 are provided with any preferred kind of anti-friction bearings 96 which carry the vertical yoke 98, from the upper end of which rises rack rod 100 which engages pinion 102 on shaft 94 thereby moving pointer 104 to automatically indicate weights on chart 106. Fastened to yoke 98 is the usual offset weight 108 to keep rack 100 properly in mesh with pinion 102.

Fast in frame 16 is the forwardly projecting stud 110 on which are pinned two collars 112 to each of which is fast a tape 114 (Figs. 3 and 4). The tapes extend vertically downward and their lower ends are fastened to the lower ends of arcuate members 116, one of which is secured to each side of lever 90, the center of generation of arc 116 being at or near the center of bearing 96.

In operation, when a load is placed on platform 24, lever 10 is drawn down against the resistance of pendulums 44 and 46 until a state of equilibrium is reached.

The fulcrum of lever 90 is on the line of contact of tapes 114 on arcuate members 116. When lever 10 moves, lever 90 is moved thereby being connected to lever 10 at 92. The weight of vertical yoke 98 is supported on the other end of lever 90 at 96, thus always drawing down on fulcrum tapes 114 and keep the other end of lever 90 in close contact with lever 10 at bearing 92.

The upper ends of fulcrum tapes 114 are fast to the frame of the machine, so when point 92 of lever 90 moves up or down with lever 10 the other end of lever 96 is lowered or raised relatively to the frame of the machine, thereby actuating indicator 104 through the instrumentality of pinion 94, rack 100 and vertical yoke 98. Tape fulcrums are used for supporting lever 90 because they accommodate themselves to the slight sidewise motion forced on them by the fact that point 92 swings in the arc of a circle from fulcrum pivot 12. A fixed fulcrum bearing could not so accommodate itself.

If the machine is shifted to an "out of level" position it will be evident that the effective leverage of one pendulum will be increased and the leverage of the other decreased, the leverage being measured horizontally from their respective pivots, but since the two pendulums are exactly similar, move in opposite directions, and are located symetrically with reference to the center line of the machine, one pendulum will gain the same amount of leverage as the other loses. Therefore, since the pendulums are interconnected by frictionless means, they will assume the same positions in counterbalancing any given load whether the scale is level or out of level, provided only that the machine is not so far out of level as to permit working parts to become displaced from their true positions sufficiently to cause friction.

Any disturbing effect on the weighing operations due to the indicating devices under out of level condition is obviated by the fact that the rack rod and the parts which actuate it are all on the center line of the machine.

What I claim is—

1. In an automatic weighing scale, in combination, a main lever, a bifurcated auxiliary lever arranged with one fork on each side of said main lever, means for actuating said auxiliary lever by direct pivotal connection to said main lever, an indicator, and means for actuating said indicator from said auxiliary lever.

2. In an automatic weighing scale, in combination, a main lever, a movable fulcrum, a bifurcated auxiliary lever, supported for oscillation on said fulcrum and arranged with one fork on each side of said main lever, means for actuating said auxiliary lever by direct pivotal connection to said main lever, an indicator, and means for actuating said indicator from said auxiliary lever.

3. In a weighing scale, in combination, a frame, a main lever pivotally supported thereon, automatic counter-balancing means connected to said lever, an auxiliary lever, and an indicator actuated by said auxiliary lever, said auxiliary lever being fulcrumed on a flexible tape secured to said frame and being actuated by direct pivotal connection to said main lever.

4. In a weighing scale, in combination, a frame, a main lever pivotally supported thereon, pendulum counter-balancing means connected to said lever, an auxiliary lever, an arcuate member fast to said auxiliary lever, and a pivotal indicator actuated through a pivotal connection to said auxiliary lever, said auxiliary lever being fulcrumed on a flexible tape secured to said frame and to said arcuate member.

5. The invention set forth in claim 4 in which said auxiliary lever is actuated by means comprising direct pivotal connection to said main lever.

In testimony whereof I hereto affix my signature.

WILLIAM N. GILBERT.